United States Patent [19]

Marchant et al.

[11] Patent Number: 4,973,832
[45] Date of Patent: Nov. 27, 1990

[54] OPTICAL HEAD CHROMATICALLY OPTIMIZED FOR SELF-FOCUSING

[75] Inventors: Alan B. Marchant; Herbert L. Engstrom, both of San Jose, Calif.

[73] Assignee: Eastman Kodak Company, Rochester, N.Y.

[21] Appl. No.: 431,252

[22] Filed: Nov. 3, 1989

[51] Int. Cl.⁵ .............................................. G01J 1/20
[52] U.S. Cl. ............................... 250/201.5; 369/44.24
[58] Field of Search .................. 250/201.5; 369/44.23, 369/44.24

[56] References Cited

U.S. PATENT DOCUMENTS

| | | | |
|---|---|---|---|
| 4,725,721 | 2/1988 | Nakamura et al. | 250/201.5 |
| 4,815,058 | 3/1989 | Nakamura et al. | 250/201.5 |
| 4,900,910 | 2/1990 | Doi | 250/201.5 |

Primary Examiner—David C. Nelms
Attorney, Agent, or Firm—Warren W. Kurz

[57] ABSTRACT

A self-focusing optical head of the type used in magneto-optical and optical recording systems for directing a focused laser beam onto a moving recording surface uses a non-achromatized optical path between the laser and recording surface and the laser wavelength (mode) shifts induced by optically coupling reflected laser energy back to the laser cavity to automatically maintain the beam in sharp focus (i.e., self-focus) on the recording surface. A focus servo system including a photodetector positioned in the path of reflected laser energy serves to coarsely position a focusing lens relative to the recording surface. A field lens, used to concentrate reflected laser energy onto the photodetector, is achromatized to compensate for the chromatic aberration between laser and photodetector. Such achromatization allows the focus servo to operate independently of the wavelength (mode) shifts required to achieve self-focusing of the laser beam on the recording surface.

5 Claims, 2 Drawing Sheets

OPTICAL HEAD CHROMATICALLY OPTIMIZED FOR SELF-FOCUSING

BACKGROUND OF THE INVENTION

This invention relates to the field of optical and magneto-optical recording. More particularly, it relates to improvements in optical head apparatus for irradiating a moving recording element with a focused beam of radiation.

Virtually all optical and magneto-optical recording systems include some sort of mechanical servo for maintaining an optical write/read beam in sharp focus on a rapidly moving recording element (e.g., a spinning optical disk). Such focus servo generally functions to continuously sense changes in the state of focus, as occurs when the recording surface moves, in a random fashion, toward and away from a nominal focus position relative to a focusing lens, and to continuously reposition the focusing lens to maintain a best focus condition. Due to the high numerical aperture (N.A.) of the focusing lens and the wavelength of the read/write beam, the focus servo must be sufficiently sensitive to maintain the lens-to-recording layer spacing to within ±1 micron.

In U.S. Pat. No. 4,725,721 issued to Nakamura et al, there is disclosed a self-focusing optical head which substantially relaxes the sensitivity requirements of the focus servo in an optical recording system. According to this disclosure, a beam of radiation emitted by a semiconductor laser is brought to focus on an optical recording element by a lens which exhibits substantial chromatic aberration. Radiation reflected by the recording element is intentionally coupled back to the laser cavity via the focusing lens and, depending on the spacing between the lens and recording element, the laser oscillates at one of a plurality of discrete longitudinal modes (wavelengths) within a certain wavelength range. Here, the laser and the recording element constitute an external resonator, which assures that the most powerful oscillation occurs at a wavelength most efficiently returned to the laser's internal cavity. By virtue of this arrangement, the focused spot follows for itself the movement of the disk over a displacement range of ±12 microns by self-adjusting the wavelength of the laser source. As a result, the focus servo need only be capable of coarsely positioning the focusing lens to within ±12 microns of a best focus position.

While the self-focusing optical head disclosed by Nakamura et al may reduce the sensitivity requirements of the focusing servo by an order of magnitude, the laser wavelength changes on which the self-focusing effect relies can degrade the servo mechanism performance. Longitudinal mode changes in a semiconductor laser occur suddenly, on a sub-nanosecond timescale. Such wavelength changes alter the radiation distribution at the focus detector and give rise to a focus error signal (S-curve) having sudden changes in level. FIG. 1 illustrates how the focus error signal appears if the laser wavelength changes by ±2 modes near the point of best focus (i.e., zero error signal). Overall, the slope of the curve appears to be flattened near focus, because each wavelength change tends to improve focus. But, as shown, the detailed shape of the curve is discontinuous, with sharp changes. This kind of distortion in the error signal acts to degrade the servo performance in two ways. Firstly, the steep edges can amplify undesired high frequency resonances in the electromechanical system. Secondly, and especially if these edges are electronically filtered out, the slope of the error signal near best focus will be very shallow and imprecisely define the point of best focus. The lack of detector linearity produced by these sudden wavelength shifts allows the mechanical system to oscillate at small amplitudes without creating a substantial direct error signal, thereby making the system unstable to any larger perturbations.

SUMMARY OF THE INVENTION

In view of the foregoing discussion, an object of the invention is to improve self-focusing optical heads of the type described by decoupling the longitudinal mode (wavelength) changes from the focus error signal.

This object is achieved by a self-focusing optical head in which the optical path between the laser and focus detector is achromatized without affecting the required longitudinal chromatic aberration in the optical path between the laser and recording element. By adding over-corrected chromatic aberration to the return path element(s) (i.e., those optical elements used exclusively to direct reflected radiation from the disk to the focus detector), any change in laser wavelength, as produced by a change in position of the recording element, will not substantially degrade or otherwise affect the focus error signal.

Like the aforementioned self-focusing optical head of the prior art, the optical head of the invention comprises a laser for selectively producing a beam of radiation of one of a plurality of discrete wavelengths within a range of wavelengths, and non-achromatized optical means for focusing such beam to a spot on a recording surface moving toward and away from the laser and for returning radiation reflected from the recording surface to the laser cavity. Unlike the prior art head, however, the optical head of the invention comprises achromatized optical means for focusing radiation reflected by the recording layer onto a photodetector, such achromatized optical means being effective to compensate for substantially all chromatic aberration in the optical path between the laser and the photodetector. As a result of using achromatized optics only in the return path (i.e., the optical path traversed exclusively by the reflected radiation), the focus error signal produced by the photodetector is not affected by the laser wavelength shifts required to achieve the self-focusing effect.

The invention and its advantages will become more apparent to those skilled in the art from the ensuing detailed description of a preferred embodiment, reference being made to the accompanying drawings.

DETAILED DESCRIPTION OF THE INVENTION

Figure 1:
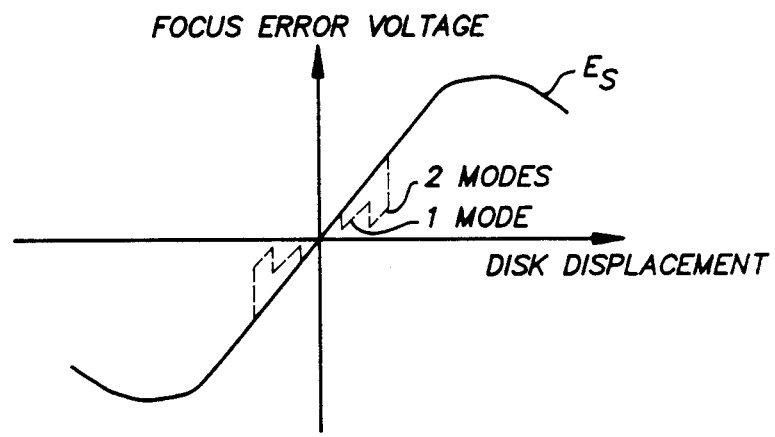
FIG. 1 illustrates an "S" curve focus error signal characteristic of prior art focus sensors used in self-focusing optical heads.
Figure 2:
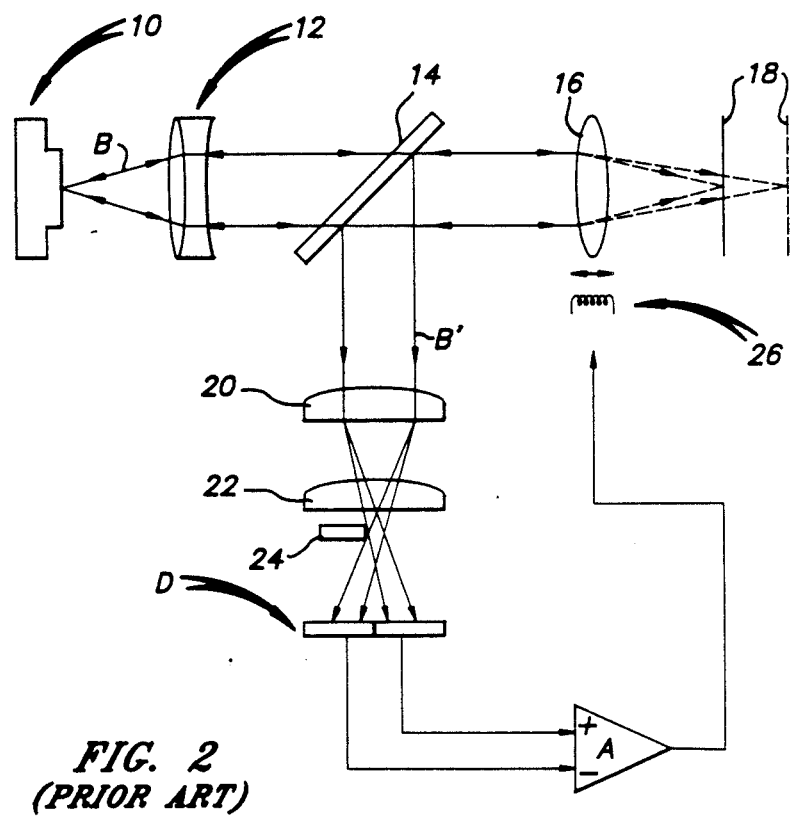
FIG. 2 schematically illustrates a prior art optical head.

Referring to the drawings, FIG. 2 schematically illustrates a self-focusing optical head of the type disclosed in the aforementioned Nakamura et al. A beam of radiation B produced by a laser diode L is collimated by a doublet lens 12. The collimated beam passes through a half-silvered mirror 14 and is focused by lens 16 on an optical disk 18 or the like. Radiation reflected by the disk is recollimated by lens 16, and a portion of the collimated reflected beam B' is deflected 90° by mirror 14 toward a split-cell photodetector D. That portion of the reflected radiation not deflected by mirror 14 is fed back to the laser cavity along the incident path. The combination of a convex lens 20, cylindrical lens 22 and a knife edge 24 functions, in a known manner, to control the distribution of reflected radiation on the split-cell focus detector. The respective outputs of the split cell's detector elements are subtracted by a differential amplifier A, and the amplifier output is applied to a voice coil 26 which controls the axial position of focusing lens 16.

As noted above, the optical head of FIG. 2 is, to a large extent, self-focusing in that the focused spot produced by lens 16 automatically tracks the movement of disk 18 as it moves toward and away from the lens. Such disk movement, of course, unavoidably occurs during disk rotation due to imperfections in the disk structure and/or in the disk-spinning apparatus. The automatic tracking of the disk by the focused spot results from the facts that (1) a portion of the radiation reflected by the disk is optically coupled back to the laser cavity via optical elements 12, 14 and 16; (2) the laser is capable of oscillating at one of a plurality of discrete wavelengths, depending on the wavelength of radiation most strongly reflected back to the laser cavity by the recording element; and (3) the optical path between the laser and disk is not achromatized to compensate for wavelength shifts of laser; hence, the wavelength most strongly returned to the laser cavity will be the wavelength focused on the disk surface 18 at any given time. Note that, due to the chromatic aberration in the optical path between the laser and surface 18, lens 16 will focus the laser beam at different locations along its optical axis. If the disk surface happens to be located at the spot of best focus for a particular wavelength, that wavelength will be reflected back to the laser cavity more efficiently than the other wavelengths at which the laser can oscillate, and the laser will continue oscillating at that wavelength. If, however, the disk surface moves closer to or away from the spot of best focus for that particular wavelength, the external resonator defined by the disk and laser will prefer to oscillate at a different wavelength and the laser will shift (mode hop) to the new preferred wavelength. Again, the new wavelength will be most sharply focused on the disk surface at its new position. The mathematical relationships governing this self-focusing effect are well described in the Nakamura et al patent, and the disclosure thereof is incorporated herein by reference.

From the foregoing, it is apparent that the self-focusing effect relies on the non-achromatized optical path between laser and disk surface. If this path were chromatically compensated for laser wavelength shifts, laser beam B would be focused at a single point, regardless of the lasing wavelength. ((In fact, many conventional optical heads (i.e., not self-focusing heads) employ achromatic optical elements to eliminate the effect of laser wavelength shifts which can occur whether or not there is any optical feedback to the laser cavity from the recording element.)) But, if the optical path between the laser and focus detector is left non-achromatized, laser wavelength shifts will alter the distribution of radiation at the detector in a manner which does not accurately reflect the physical change in position between the recording element and the focusing lens.

According to the present invention, the aforementioned laser wavelength shifts are decoupled from the focus error signal by achromatizing the entire optical path traveled by radiation emitted by the laser and received by the focus detector, but not that portion of such path between the laser and recording element. This leaves the self-focusing effect to improve focus quality completely independent of the focus servo system. According to a preferred embodiment, such achromatization is achieved by achromatizing a field lens used exclusively for focusing reflected radiation onto the focus detector. The invention will be best understood by referring to FIG. 3 which illustrates an optical read/write head embodying the invention.

Figure 3:
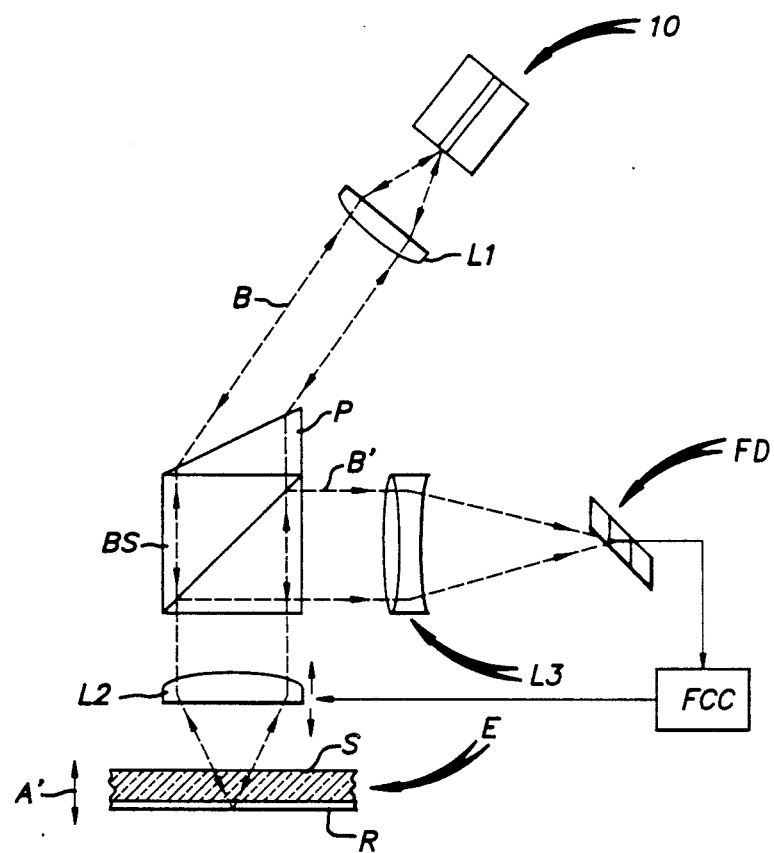
FIG. 3 schematically illustrates the chromatically optimized, self-focusing optical head of the invention.

Referring to FIG. 3, laser radiation emitted by a diode laser 10 is collimated by lens L1. The collimated beam B is circularized by prism P and passed through a beam-splitter BS to an objective lens L2. The latter serves to focus the laser radiation through a transparent substrate S and onto the recording layer R of recording element E. Radiation reflected by the recording layer is re-collimated by lens L2 and a major portion is reflected by the beam-splitter toward a field lens L3 which serves to focus the reflected beam B' onto a focus detector FD. Depending on the focus detecting scheme, lens L3 may have a substantially spherical contour (i.e. with equal optical power in mutually perpendicular coordinates) or be astigmatic, such as a cylindrical lens. A spherical lens is useful with a six-element photodetector (as shown) to minotor spot size, and an astigmatic lens is useful with a quad-cell detector to monitor spot shape. The output of the focus detector is processed, in a known manner, by a focus control circuit FCC which controls the focus position of lens L2. The remaining portion of the reflected energy passes through the beam-splitter and returns to the optical cavity of the laser where, as described above, it determines the wavelength at which the laser emits. To prevent these wavelength shifts from altering the focus error signal, lens L3 is achromatized, in a known manner, so that, over the wavelength range through which the laser may operate (e.g., between 765 and 795 nm) the optical path from laser to detector lens exhibits substantially no chromatic aberrations. Note, lens L3, considered separately, will exhibit substantial (over-corrected) chromatic aberration over the lasing wavelength range, because it must compensate for any and all longitudinal chromatic aberrations introduced by optical elements L1, L2, P and BS, as well as those introduced by the recording element substrate. When so achromatized, the focus error signal is unaffected by the wavelength changes required by te self-focusing effect, and the aforementioned problems of the prior art optical heads are alleviated. As shown in FIG. 3, lens L3 preferably takes the form of a chromatic doublet in which the positive element comprises a crown glass (e.g. BK7) with a refractive index of about 1.52 and a dispersion constant of about 64, and the negative element comprises a flint glass (e.g. SF11) with a refractive index of about 1.78 and a dispersion constant of about 26. Such a doublet is useful when the laser wavelength varies over the aforementioned wavelength range.

The principles of the invention described above apply whether the laser operates in a single mode (i.e. emitting but a single wavelength) or in a multimode in which the laser emits at a plurality of wavelengths simultaneously. In the multimode, however, the laser will oscillate more intensely at one or more of the multiple wavelengths, and the predominant or average wavelength will shift according to the self-focusing phenomena. In the multimode case, the distribution of radiation among the various modes changes, and the effects on the optical head performance can be analyzed by considering the predominant wavelength.

The invention has been described in detail with particular reference to a certain preferred embodiment thereof, but it will be understood that variations and modifications can be effected within the spirit and scope of the invention.

We claim:

1. In an optical read/write head comprising:
   (a) a laser diode for selectively producing a beam of radiation having a single or predominant wavelength within a range of wavelengths;
   (b) first optical means for focusing said beam of radiation to a spot on a recording surface moving toward and away from said laser, said first optical means serving to return radiation reflected by such surface to the laser, the instantaneous displacement between the laser and surface determining the predominant wavelength within said range of wavelengths;
   (c) focus-detecting means for producing a focus error signal;
   (d) beam-deflecting means for deflecting a portion of the radiation reflected by such surface toward said focus-detecting means; and
   (e) transducer means responsive to said focus error signal to control the position of said first optical means relative to said surface, the improvement comprising:
   (f) second optical means for focusing radiation deflected by said beam-splitting means onto said focus-detecting means, said second optical means being chromatically corrected to totally compensate for longitudinal chromatic aberrations affecting the optical path between said laser and said detector over said range of wavelengths, whereby any change in said single or predominant wavelength within said range of said beam has no substantial effect on the distribution of reflected radiation at the detector.

2. The apparatus as defined by claim 1 wherein said second optical means comprises a chromatically-corrected lens for focusing reflected radiation onto said focus-detecting means.

3. The apparatus as defined by claim 2 wherein said chromatically-corrected lens comprises an astigmatic lens, and wherein said focus-detecting means comprises a quad-cell.

4. The apparatus as defined by claim 2 wherein said chromatically-corrected lens comprises a chromatic doublet comprising a crown glass element and a flint glass element.

5. An optical read/write head comprising:
   (a) a laser for selectively producing a beam of radiation having a single or predominant wavelength within a range of wavelengths;
   (b) first optical means for directing said beam of radiation to a spot on a recording surface moving toward and away from said laser, said first optical means serving to return radiation reflected by such surface to the laser, the instantaneous displacement between the laser and surface determining the discrete wavelength at which the laser emits most strongly;
   (c) focus-detecting means for producing a focus error signal;
   (d) beam-splitting means for deflecting a portion of the radiation reflected by such surface toward said focus-detecting means;
   (e) transducer means responsive to said focus error signal to control the position of said first optical means relative to said surface, and
   (f) second optical means for focusing radiation deflected by said beam-splitting means onto said focus-detecting means, said second optical means being corrected to totally compensate for longitudinal chromatic aberrations affecting the optical path between said laser and said detector over said range of wavelengths, whereby any change in wavelength of said beam has no substantial effect on the distribution of reflected radiation at the detector.

* * * * *